Feb. 27, 1962 V. P. DONNER 3,023,014
SEAL BETWEEN RELATIVELY ROTATING MEMBERS
Filed Nov. 18, 1957
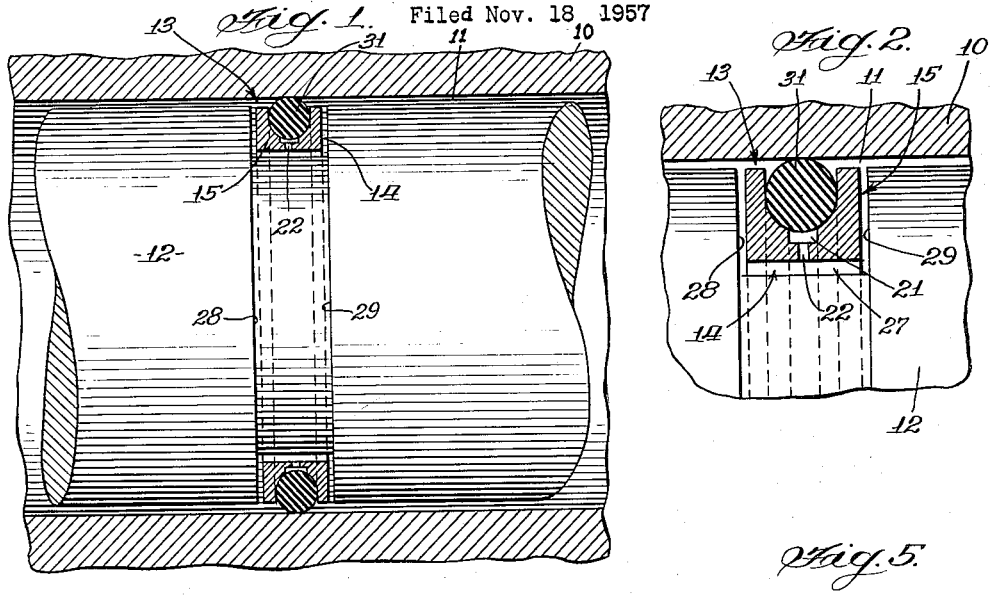
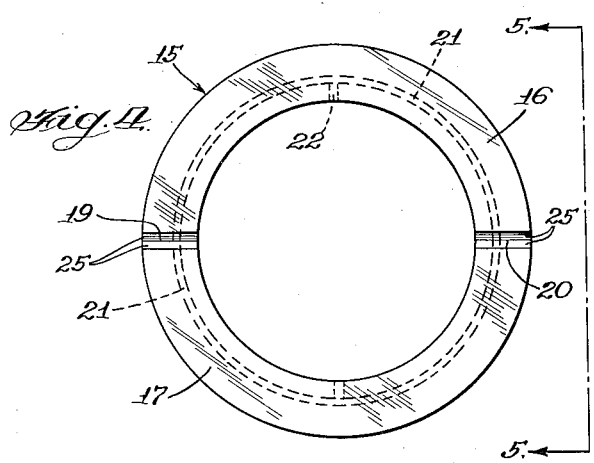
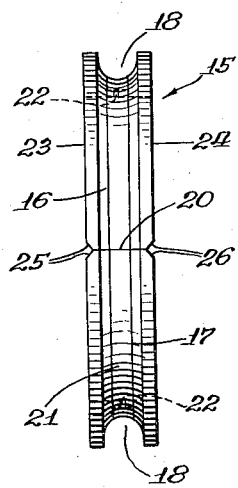
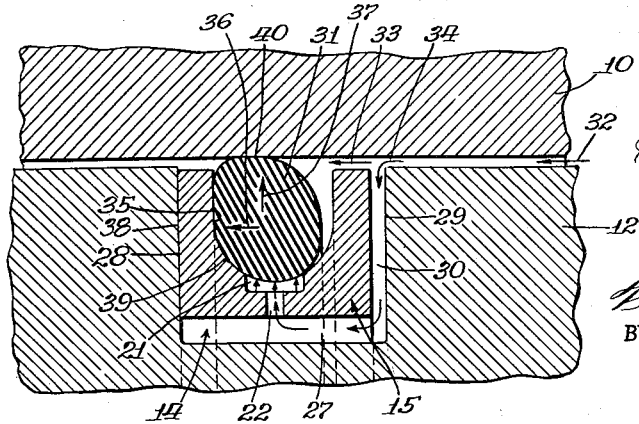
INVENTOR.
Verne P. Donner
BY Paul O. Pippel
Atty.

3,023,014
SEAL BETWEEN RELATIVELY ROTATING MEMBERS

Verne P. Donner, Palatine, Ill., assignor to International Harvester Company, Chicago, Ill., a corporation of New Jersey
Filed Nov. 18, 1957, Ser. No. 697,131
8 Claims. (Cl. 277—78)

This invention relates to a seal between a hollow member and a shaft.

An object of the invention is to provide a seal having a longer life than the conventional seal.

Another object of the invention is to provide a seal having a very small amount of wear.

A further object of the invention is to provide a seal that can withstand higher fluid pressures along the shaft than the conventional seal.

A still further object of the invention is to provide a seal that has no increase in leakage after substantial use over the initial leakage when the seal is installed.

The foregoing and other objects of the invention will be apparent from the construction and arrangement illustrated in the accompanying drawings wherein:

FIGURE 1 is a partly sectional and partly elevational view of a seal between a shaft and a hollow member.

FIGURE 2 is an enlarged view of a fragmentary portion of FIGURE 1,

FIGURE 3 is a view similar to FIGURE 2 but showing the position of the seal while under fluid pressure, FIGURE 4 is a detail side elevational view of the semi-circular sections of the seal, and FIGURE 5 is a view taken on the line 5—5 of FIGURE 4.

In the past it has been the practice to have a seal between a shaft and a hollow member comprised of a plurality of spaced annular grooves in the shaft and a split metal ring disposed in each groove. The metal rings spring against the inner periphery of the hollow member and the shaft rotates with respect to the metal rings. During use the metal rings frequently rotate with respect to the hollow member and cut depressions in the inner periphery of the hollow member so that there is leakage between the metal rings and the hollow member causing the seal to be ineffective. Where there is an enlarged annular space in the wall of the bore of the hollow member and it is desired to locate the seal beyond this enlarged annular space it is necessary to push the seal and the adjacent portion of the shaft through this enlarged annular space. When the seal enters this enlarged annular space the metal rings spring out and will engage the wall of the enlarged annular space so that the seal cannot be moved past the enlarged annular space.

The invention proposes a seal between a shaft and a hollow member. The seal is comprised of an annular groove in the shaft and a pair of semi-circular sections disposed in the groove in the shaft in abutting relation. Each semi-circular section is provided with an annular groove in its outer periphery and an annular groove in the bottom of the first named annular groove and a hole extending from its inner periphery to the second named groove. A resilient ring is disposed in the grooves in the outer peripheries of the semi-circular sections and holds the sections together and bears against the inner periphery of the hollow member. Fluid between the shaft and hollow member moves the semi-circular sections against the remote side wall of the groove in the shaft to form a sealing surface and also enters the holes in the semi-circular sections to distort the resilient ring to form two more sealing surfaces. The advantages of this seal are that it has a longer life than the conventional seal described above and has a very small amount of wear and can withstand higher fluid pressures along the shaft than the conventional seal and there is no increase in leakage after the seal has had substantial use over the initial leakage when the seal is installed. This seal can also be moved through an enlarged annular space in the wall of the bore of the hollow member without the components of the seal moving out of their assembled position. Therefore the seal will not interfere with the placing of the shaft in or removing the shaft from a hollow member having an enlarged annular space in the wall of its bore.

In the drawings, 10 designates a member having a circular opening 11 therethrough. The member 10 is stationary. A rotating shaft 12 is disposed in the member 10. The invention is concerned with a seal between the rotating shaft 12 and the member 10 to prevent flow of fluid or liquid past the seal. The seal is generally designated 13 and is comprised of an annular groove 14. A ring or ring structure 15 is disposed in the groove 14 in the shaft 12 and is comprised of a pair of semi-circular sections 16 and 17 arranged on the shaft in abutting relation with respect to each other. The semi-circular sections 16 and 17 may be of carbon, graphite, bronze, silver or steel. Each of the semi-circular sections 16 and 17 are identical, therefore, only the section 16 will be described. The section 16 has a groove 18 in its outer periphery extending from one end 19 to the other end 20 thereof. The section 16 has a cavity or groove 21 in the bottom of groove 18 of lesser width than groove 18 beginning at end 19 and terminating at end 20. The section 16 also has a hole 22 therein extending from the inner periphery thereof to the groove 21 and the end edges contiguous with opposite faces 23 and 24 are beveled as at 25 and 26. The hole 22 constitutes passage means communicating between the bottom portion of the ring structure groove 21, 18 and the shaft groove 14. The annular space occupied by the arrow 33 in FIG. 3, between the outer periphery of the ring structure 15 and the cylindrical periphery of the bore 11, constitutes means providing communication between the right end of the ring structure 15 and the right end of the elastomeric ring 31 which is most proximate to such right end of the ring structure. The inner peripheries of sections 16 and 17 are spaced from the bottom of groove 14 in the shaft as indicated at 27 and the faces 23 and 24 of the sections are also spaced from the opposite walls 28 and 29 of the groove 14 as indicated at 30. A resilient ring 31 made of rubber or synthetic material, commonly generically referred to as an elastomeric material, is disposed in the grooves 18 of the sections 16 and 17 and holds the sections together in assembled relation. The ring 31 has an outside diameter greater than the inside diameter of the member 15.

The operation of the seal is as follows: Assuming liquid is flowing between the member 10 and the shaft 12 in the direction indicated by the arrow 32 the liquid flows between the semi-circular sections 16 and 17 and the member as indicated by the arrow 33 and the liquid also flows between the face 24 of the sections and the wall 29 of groove 14 as indicated by the arrow 34 to move the semi-circular sections against the wall 28 of the groove. The liquid also flows through the holes 22 in the sections 16 and 17 and then into the grooves 21 where it urges the resilient ring 31 against the walls 35 of the sections as indicated by the arrows 36 and the liquid also urges the resilient ring against the inner periphery of the member 10 as indicated by the arrow 37. In practice it has been found that the combined effect of the pressures indicated by arrows 33, 36 and 37 is to distort the resilient ring 31 as shown in FIGURE 3. The liquid in distorting the resilient ring 31 holds the sections 16 and 17 tighter together than when the sections and the resilient ring were initially assembled. The grooves 21 in the sections 16 and 17 receive liquid through holes 22 to cancel out some outward force on the resilient ring 31 due to hydraulic pressure thereby eliminating the possibility of the sections ever contacting the inner periphery of the member 10. The roundness of the sections 16 and 17 is not important since they are spaced from the bottom of the groove 14 in the shaft and are also spaced from the inner periphery of the member 10. The liquid flows between the semi-circular sections 16 and 17 along the beveled edges 25 to provide lubrication of the sealing surface 38 between the wall 28 of the groove in the shaft and the semi-circular sections. A sealing surface is also provided at 39 between the walls 35 of the grooves in the sections 16 and 17 and the resilient ring 31 and a sealing surface is also provided at 40 between the resilient ring and the inner periphery of the member 10. It will be noted that resilient ring 31 having a larger outside diameter than the diameter of the opening 11 bears against the wall of the opening so that it does not rotate and the resilient ring holds the semi-circular sections 16 and 17 together so that they do not rotate. The grooves 21 and holes 22 prevent fluid pressure from separating the semi-circular sections 16 and 17.

This seal has the advantages of having a longer life than the conventional seal and it has a very small amount of wear and can withstand higher fluid pressures along the shaft 12 than the conventional seal and there is no increase in leakage after substantial use over the initial leakage when the seal is installed. The initial leakage is that which passes between the ends of the semi-circular sections 16 and 17 and the beveled edges 25 or 26. There is only one groove to cut in the shaft 12 so that applicant's seal takes up less space along the shaft than the conventional seal which has a plurality of spaced grooves cut in the shaft.

The seal 13 will also be effective as a seal when the liquid between the shaft 12 and member 10 is flowing toward the seal in a direction opposite to the arrow 32. Thus the seal 13 is effective as a seal for both directions of liquid flow along the shaft 12. A split ring can be used instead of the semi-circular sections 16 and 17. The advantage of the split ring with the resilient ring over two semi-circular members is that there is less leakage through the seal. The leakage is greater past the semi-circular sections 16 and 17 because there are two places between the semi-circular sections for oil to flow through whereas in a split ring there is only one place for oil to flow through. After oil leaks past the semi-circular sections 16 and 17 or the split ring as the case may be it will then leak past seal surface 38.

What is claimed is:

1. A seal between a member having an opening therethrough and a shaft disposed in the opening in the member comprising an annular groove in the shaft, a ring disposed in the annular groove in the shaft and provided with a first annular groove in its outer periphery and a second annular groove in the bottom of the first groove of lesser width than the first groove and provided with a hole in communication between the second groove and the annular groove in the shaft, and a resilient ring disposed in the first groove of the first named ring and and having an outside diameter greater than the outside diameter of the first named ring, fluid flowing between the member and the shaft and between one wall of the groove in the shaft and the first named ring to move the first named ring against the opposite wall of the groove in the shaft to form a sealing surface and fluid entering the hole in the first named ring and flowing into the second groove and urging the resilient ring against the wall of the first groove in the first named ring adjacent said opposite wall of the groove in the shaft to form a second sealing surface and also urging the resilient ring against the inner periphery of the member to form a third sealing surface.

2. A seal between a member having an opening therethrough and a shaft disposed in the opening in the member comprising an annular groove in the shaft, a ring disposed in the annular groove in the shaft and provided with a first annular groove in its outer periphery and a second annular groove in the bottom of the first groove of lesser width than the first groove and provided with a hole in communication between the second groove and said annular groove of the shaft and a recess in one face, and a resilient ring disposed in the first groove of the first named ring and having an outside diameter greater than the inside diameter of the member, fluid flowing between the member and the shaft and between one wall of the groove in the shaft and the first named ring to move the first named ring against the opposite wall of the groove in the shaft to form a first sealing surface and fluid entering the hole in the first named ring into the second groove and urging the resilient ring against the wall of the first groove in the first named ring adjacent said opposite wall of the groove in the shaft to form a second sealing surface and also urging the resilient ring against the inner periphery of the member to form a third sealing surface and fluid flowing through the recess of the first named ring to provide lubrication of the first sealing surface.

3. A seal between a member having an opening therethrough and a shaft disposed in the opening in the member comprising an annular groove in the shaft, a ring disposed in the annular groove in the shaft so that it is spaced from opposite walls of the groove and from the bottom of the groove and provided with a first annular groove in its outer periphery and a second annular groove in the bottom of the first groove of lesser width than the first groove and provided with a hole in communication between the second groove and said annular groove of the shaft, and a resilient ring disposed in the first groove of the first named ring and having an outside diameter greater than the inside diameter of the member, fluid flowing between the member and the shaft and between either opposite wall of the groove in the shaft and the first named ring to move the first named ring against the other opposite wall of the groove in the shaft to form a first sealing surface and fluid entering the hole in the first named ring into the second groove and urging the resilient ring against the wall of the first groove in the first named ring adjacent the first sealing surface to form a second sealing surface and also urging the resilient ring against the inner periphery of the member to form a third sealing surface.

4. A seal between a member having an opening therethrough and a shaft disposed in the opening in the member comprising an annular groove in the shaft, a pair of semi-circular sections disposed in the annular groove in the shaft and each of the semi-circular sections being provided with a first groove in its outer periphery along the full extent of its outer periphery and a second groove in the bottom of the respective first groove having the same extent as the first groove and of lesser width than the first groove and each section being provided with a hole in communication, between its second groove and said annular groove of the shaft, and a resilient ring disposed in the first grooves of the semi-circular sections and having an outside diameter greater than the outside diameter of the semi-circular sections, fluid flowing between the member and the shaft and between one wall of the groove in the shaft and the semi-circular sections to move the semi-circular sections against the opposite wall of the groove in the shaft to form a first sealing surface and fluid entering the holes in the semi-circular sections into the second grooves and urging the resilient ring against the walls of the first grooves in the semi-circular sections adjacent said opposite wall of the groove in the shaft to form a second sealing surface and also urging the resilient ring against the inner periphery of the member to form a third sealing surface.

5. A seal between a stationary hollow member and a rotating shaft comprising an annular groove in the shaft, a pair of semi-circular sections disposed in the annular groove in the shaft and each of the semi-circular sections being provided with a first groove in its outer periphery along the full extent of its outer periphery and a second groove in the bottom of the respective first groove having the same extent as the first groove and of lesser width than the first groove and each section being provided between its second groove and a hole in communication with said annular groove of the shaft and the ends of the sections being beveled, and a resilient ring disposed in the first grooves of the semi-circular sections and having an outside diameter greater than the outside diameter of the semi-circular sections, fluid flowing between the hollow member and the shaft and between one wall of the groove in the shaft and the semi-circular sections to move the semi-circular sections against the opposite wall of the groove in the shaft to form a first sealing surface and fluid entering the holes in the semi-circular sections into the second grooves and urging the resilient ring against the walls of the first grooves in the semi-circular sections adjacent said opposite wall of the groove in the shaft and also urging the resilient ring against the inner periphery of the hollow member and fluid flowing along the beveled ends of the semi-circular sections to provide lubrication of the sealing surface.

6. A seal between a member having a bore with a cylindrical periphery extending through such member and a shaft disposed coaxially in such bore, the shaft having an annular groove with opposite sides and a bottom and also disposed within the bore; said seal comprising a radially expansible ring structure disposed in the shaft groove and provided with a first annular groove in its outer periphery and a second annular groove of less width than the first groove, the ring also having a passage communicating between the second groove and the groove in the shaft, and an elastomeric ring circumscribing the ring structure within the first groove thereof and being under internal stress to grip radially inward upon such structure to resist radial expansion thereof, the elastomeric ring being of such radial thickness that the radially outer periphery of such ring tends to diametrically exceed the diameter of the member bore wherein such ring is confined and thus cause the outer periphery of the ring to press radially against the cylindrical periphery of the bore, the ring structure being operable responsively to the pressure of fluid introduced between one end thereof and one wall of the shaft groove adjacent thereto to axially move into seating engagement with the opposite wall of the shaft groove, the ring passage being conductive of such fluid from the shaft groove into the second groove of the ring structure to subject the elastomeric ring to radially outward pressure of such fluid while subjecting the bottom of such groove to radially inward pressure, and means providing communication between the one end of the ring structure and the end of the elastomeric ring most proximate to the one end of the ring structure to subject such proximate end of the elastomeric ring to the pressure of the fluid to press the opposite end of the elastomeric ring against the wall of the first groove most proximate thereto.

7. A seal between a member having a bore with a cylindrical periphery extending through such member, and a shaft disposed coaxially in such bore, the shaft having an annular groove with opposite sides and a bottom and also disposed within the bore; said seal comprising a radially expansible ring structure disposed in the shaft groove and provided with an annular groove extending about its radially outer periphery, the ring structure groove having opposite sides and a bottom, passage means communicating between the bottom portion of the ring structure groove and the shaft groove, and an elastomeric ring circumscribing the ring structure within its groove and being under internal stress to grip radially inward upon at least a portion of the bottom of such groove to resist radial expansion of the ring structure, the elastomeric ring being of such radial thickness that the radially outer periphery thereof tends to diametrically exceed the diameter of the member bore wherein such ring is confined and thus cause such outer periphery of the ring to press radially against the cylindrical periphery of the bore, the ring structure being operable responsively to the pressure of fluid introduced between one end thereof and one wall of the shaft groove adjacent thereto to axially move into sealing engagement with the opposite wall of the shaft groove, said passage means being conductive of such fluid from the shaft groove into the bottom portion of the ring structure groove to subject the elastomeric ring to radially outward pressure while subjecting the bottom of the ring structure groove to radially inward pressure, and means providing communication between the one end of the expansible ring structure and the end of the elastomeric ring most proximate to the one end of such ring structure to subject such proximate end of the elastomeric ring to the pressure of the fluid to press the opposite end of the ring against the opposite wall of the expansible ring structure groove.

8. A seal unit comprising a radially outwardly expansible ring structure provided with annular sealing end faces and an annular outwardly opening groove extending about its radially outer periphery, said groove having opposite sides and a bottom having cavity means substantially coextensive with the circumferential extent of the bottom, an elastomeric ring circumscribing the ring structure within its groove and being under internal stress to grip radially inward upon at least a portion of the bottom of such groove to resist radial outward expansion of the ring structure, the elastomeric ring being of such radial thickness that the radially outer periphery diametrically exceeds the outer diameter of the ring structure while such elastomeric ring is in said groove and while such outer periphery of the elastomeric ring is unrestrained against radial expansion, the portion of the unrestrained ring within the ring structure groove being of less volume than the capacity of the groove, and passage means communicating between the cavity means of the bottom of the ring structure groove and the radially inner periphery of the ring structure.

References Cited in the file of this patent

UNITED STATES PATENTS

| | | |
|---|---|---|
| 2,349,170 | Jackman | May 16, 1944 |
| 2,437,586 | Aber | Mar. 9, 1948 |
| 2,483,827 | Guiler | Oct. 4, 1949 |
| 2,570,427 | Chillson et al. | Oct. 9, 1951 |
| 2,647,772 | Wernert | Aug. 4, 1953 |
| 2,728,620 | Krueger | Dec. 27, 1955 |
| 2,799,523 | Parker | July 16, 1957 |